(12) United States Patent
Spence et al.

(10) Patent No.: US 6,407,911 B1
(45) Date of Patent: Jun. 18, 2002

(54) SEALED PORTABLE ELECTRONICS DEVICE HAVING EXPANSION PORT

(75) Inventors: Gary D. Spence, Mendon; Jeffery D. Ricks, Logan, both of UT (US)

(73) Assignee: Juniper Systems, Inc., North Logan, UT (US)

(*) Notice: Subject to any disclaimer, the term of this patent is extended or adjusted under 35 U.S.C. 154(b) by 0 days.

(21) Appl. No.: 09/685,467

(22) Filed: Oct. 10, 2000

(51) Int. Cl.[7] .................................................. G06F 1/16
(52) U.S. Cl. ..................... 361/683; 361/725; 312/223.2; 174/35 MS
(58) Field of Search .......................... 361/683, 724–727, 361/684–686; 248/556, 557; 312/223.1–223.6, 351.6, 351.8; 70/57–58, 154, 192; 174/35 GC, 35 MS, 35 R (56) References Cited

U.S. PATENT DOCUMENTS

| | | | |
|---|---|---|---|
| 5,801,918 A | * | 9/1998 | Ahearn et al. ............... 361/683 |
| 5,831,819 A | * | 11/1998 | Chacon et al. ............... 361/683 |
| 5,847,938 A | * | 12/1998 | Gammon ..................... 361/816 |
| 6,023,147 A | * | 2/2000 | Cargin, Jr. et al. ......... 320/114 |

\* cited by examiner

Primary Examiner—Darren Schuberg
Assistant Examiner—Hung Van Duong
(74) Attorney, Agent, or Firm—Workman, Nydegger & Seeley (57) ABSTRACT

Portable electronics devices having a sealed housing and an expansion port that does not interfere with the sealed nature of the housing. The housing has a front portion and a back portion connected one to another at a sealed interface. The sealed interface can include a pliable gasket that conforms to both the front and back portions, making the housing substantially watertight. Near the distal end of the electronics device, where the expansion port is formed, the sealed interface is displaced toward the front of the housing. The expansion port can thereby be positioned behind the sealed interface such that the expansion port does not straddle or interfere with the sealed interface. Because the expansion port does not interfere with the sealed interface, the gasket can have a relatively simple shape. The electronics device can accept expansion cards and devices while maintaining the integrity of the sealed housing. The electronics device can therefore be used in adverse environments where water, dirt, or dust can be encountered without damaging the internal components of the electronics device.

20 Claims, 7 Drawing Sheets

SEALED PORTABLE ELECTRONICS DEVICE HAVING EXPANSION PORT

BACKGROUND OF THE INVENTION

1. The Field of the Invention

The present invention relates to portable electronics devices, such as handheld computers. Specifically, the present invention relates to portable electronics devices having housings that are sealed and that also have expansion ports that do not compromise the integrity of the sealed housing.

2. The Prior State of the Art

During recent decades, electronics devices have become smaller, more lightweight, and more widely used in a variety of industries and endeavors. Early computers used vacuum tubes and other large-scale components and, accordingly, were large devices that were immovable fixtures and at times could fill an entire room. With the advent of liquid crystal display devices, integrated circuits and silicon semiconductor chips, computers and other electronics devices have steadily increased in computing power and decreased in size.

In recent years, the demand for access to computing power, coupled with the significant decrease in computer size has yielded portable electronics devices, such as laptop computers, which enable users to carry computing resources that previously were limited to relatively fixed, desktop computers. Special-purpose computing and communication devices have also been developed, including digital personal assistants, cellular phones, global positioning system receivers, and any number of other electronics devices.

This proliferation has taken computers and electronics devices from the relatively sterile conditions of the laboratory and the office to environments and industries where the devices are more likely to experience dirty or adverse conditions, including transportation environments, manufacturing, agriculture, natural resource industries, etc. Some electronics devices have been designed specifically for use outdoors and in other dirty or unpredictable environments. These devices are typically rugged, and can withstand some amount of vibration and shock, dust, dirt, and exposure to water or foreign material. Typical rugged electronics devices have housings formed from a front and back portions that are secured together at a sealed interface. The two portions of the housing define an interior in which the functional components of the electronics device are housed. The sealed interface often includes a gasket that conforms to both the front and back portions such that the sealed interface is watertight.

Many computers and other electronics devices have expansion ports that are adapted to receive peripherals, storage media, communication devices, and the like, including those that could be developed in the future. Expansion ports enable users to take advantage of new technology without having to discard existing electronics devices. Portable electronics devices are often equipped with expansion ports. A common and intuitive position for expansion ports on portable electronics devices is at either end of the device. Such expansion ports can receive expansion devices without interfering with the keypad structures and display devices associated with the electronics device or with the ability of users to hold the electronics device. Specifically, expansion ports are often oriented such that expansion devices engage and disengage in a direction that is parallel to the plane defined by the working surface of the electronics device.

While the foregoing position and orientation of expansion ports in electronics devices is advantageous for many devices, it creates problems when used with rugged devices. In order to position and orient an expansion port in conventional rugged electronics device in this manner, the expansion port must straddle the sealed interface between the front and back portions of the housing. As a result, the expansion port interferes with the integrity of the sealed interface and can cause the gasket to have to be of a relatively complex shape. This problem has resulted in rugged electronics devices that either do not have expansion ports or that compromise the sealed nature of the housing if expansion ports are included.

SUMMARY OF THE INVENTION

The present invention relates to electronics devices that have sealed housings and that also have an expansion port that does not interfere with the integrity of the seal. As in conventional electronics devices, the expansion port of the invention is positioned generally at one end of the device and is oriented such that expansion devices are engaged and disengaged in a direction that is generally parallel to a plane defined by a working surface of the electronics devices.

According to one aspect of the invention, an electronics device has a housing with a front portion and a back portion that are connected at a sealed interface. The electronics device has a plane defined by a working surface of a keypad structure formed on the front of the device. Near the end of the device that has the expansion port, which is typically the distal or top end, the sealed interface deviates from being parallel to the plane defined by the working surface. Generally, the sealed interface near the distal end is positioned nearer to the front surface of the device than it would be in a conventional electronics device. Positioning the sealed interface in this manner permits an expansion port to be formed in the housing without straddling the sealed interface or the gasket associated with the sealed interface. Typically, the expansion port is formed to the back of the sealed interface. A door protecting the expansion port can be opened without interfering with the sealed interface.

A housing formed according to the invention permits rugged electronics devices to be effectively sealed and to receive expansion devices. Examples of the expansion devices which can be received in the expansion ports include mass data storage devices, input/output devices, or other devices to enhance the capabilities of the electronics device. Gaskets used with sealed interfaces in such devices can be relatively simple because they do not have to be adapted to the intricacies of the expansion port.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawing depict only typical embodiments of the invention and are not therefore

DETAILED DESCRIPTION OF THE PREFERRED EMBODIMENTS

The present invention relates to portable electronic devices having expansion ports that do not straddle or interfere with a seal between front and back portions of the housing of the electronics devices or with a gasket associated with the seal. The expansion port is typically positioned at the distal end, or top section, of the housing to the back of the sealed interface between the front and back portions of the housing. With the expansion port in this position, the seal maintains its integrity and the gasket associated with the seal can have a relatively simple structure.

The expansion ports are described herein in the context of a handheld, portable computer. The handheld computer specifically disclosed herein represents handheld electronics devices in which the invention can be practiced. The expansion ports can exist with or without the other novel features described in reference to the portable computer. An electronics device that has the expansion ports disclosed herein has a sealed housing that maintains its integrity in adverse environmental conditions. When combined with the other features disclosed herein, an electronics device with the expansion port of the invention can also be comfortably held for long periods and can withstand harsh environmental conditions in other ways.

Figure 1:
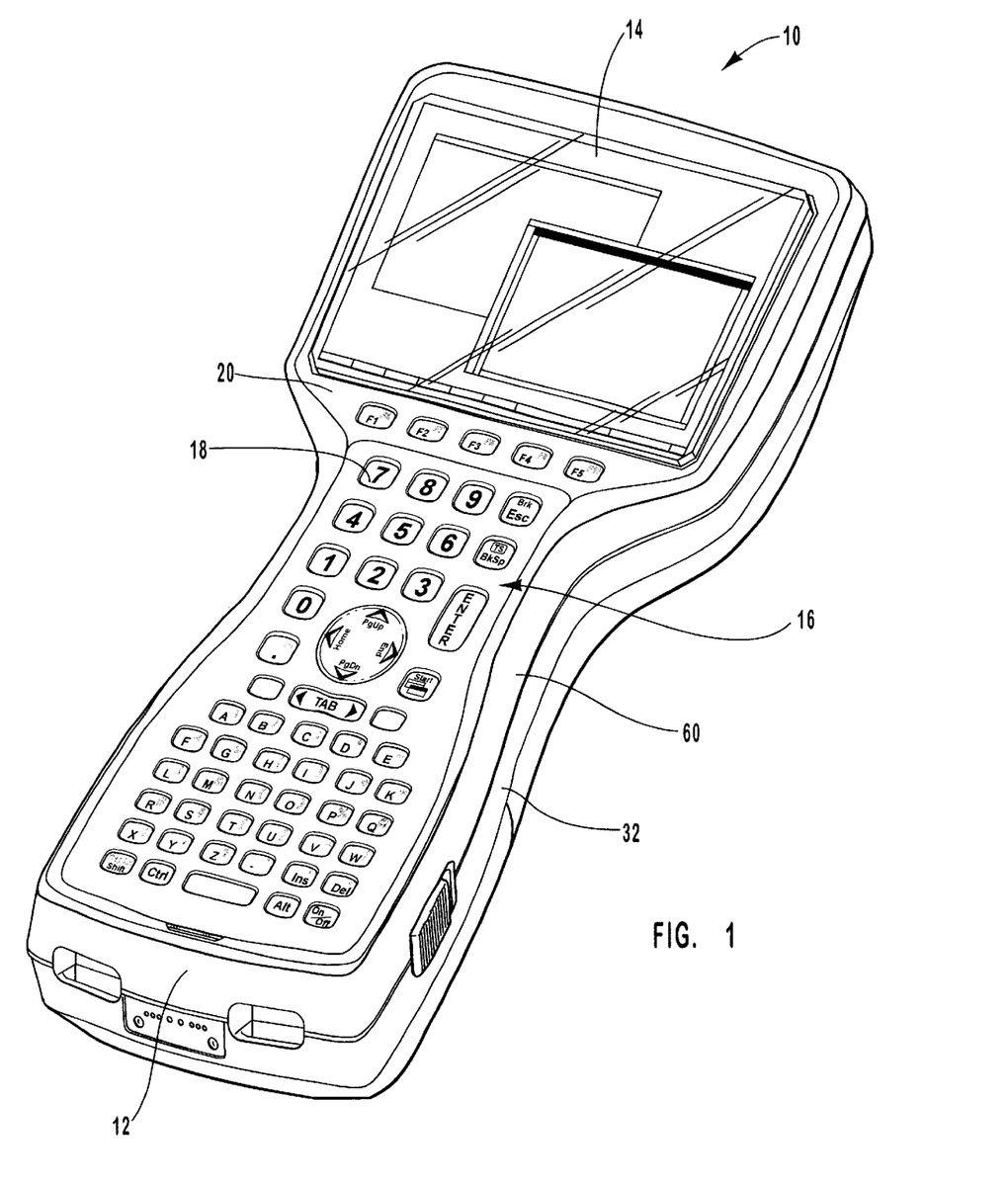
FIG. 1 is a perspective view of a handheld computer that includes an expansion port of the invention.

FIG. 1 is a perspective view of a handheld computer having an expansion port that enables the computer to receive expansion devices while maintaining the integrity of its sealed housing. The computer 10 has a housing 12 that encases the processing components of the computer and protects the computer from environmental conditions. Computer 10 has a display device, the screen of which is shown in FIG. 1 at reference number 14. A keypad structure 16 with alphanumeric keys 18 is positioned on the front surface 20 of housing 12.

1. Expansion Port

Figure 2:
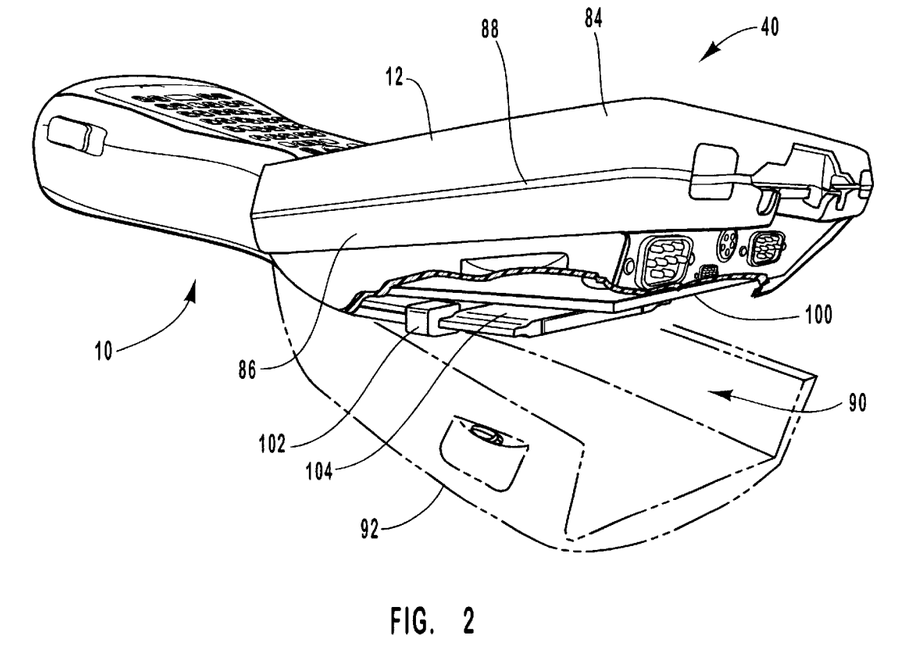
FIG. 2 is a perspective view of the handheld computer of FIG. 1 showing an expansion port in relation to a sealed interface between a front portion and a back portion of the housing.
Figure 3:
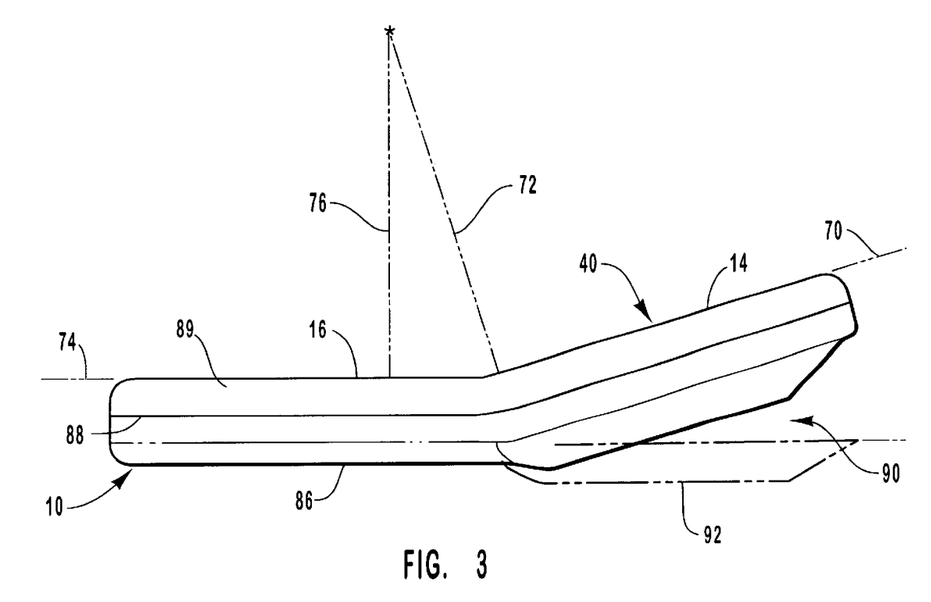
FIG. 3 is a side view of the handheld computer of FIG. 1, showing the angular position of the screen with respect to the keypad structure.

FIGS. 2 and 3 illustrate one embodiment of computer 10 having an expansion port that accepts expansion devices, examples of which include expansion cards, peripheral devices, communication devices, or any other structure that currently exists or that will be developed in the future to enhance the capabilities of computer 10. In FIGS. 2 and 3, computer 10 is a rugged portable computer that has features adapted to protecting processing components housed in housing 12 from adverse conditions, dirt, water, dust, etc. Housing 12 is formed from a front portion 84 and a back portion 86 that are connected at by a gasket or another sealing structure at seal 88, which extends about the periphery of housing 12. In order to enhance the watertight nature of seal 88, the associated gasket can be formed of a pliable material that conforms to both front portion 84 and back portion 86.

As shown in FIGS. 2 and 3, seal 88 and the associated gasket do not lie in a single plane, but are displaced upwards in the portion of seal 88 that is included in the top section 40 of computer 10. The displacement of the portion of seal 88 included in top section 40 according to one embodiment can be described in reference to the planes in which the various portions of seal 88 lie. For example, the portion of seal near the bottom end of computer 10 (e.g., the end nearest the user when computer 10 is held by a user during normal operation) can lie in a sealing plane that may be substantially parallel to a plane defined by keypad structure 16. Near the top end (e.g, the end of computer 10 at top section 40), seal 88 can be displaced toward the front surface 20 of computer 10.

The foregoing position of seal 88 provides sufficient space for an expansion port, which is shown generally at reference number 90, to be formed in top section 40 and in back portion 86 of the housing without straddling or interfering with the integrity or the operation of seal 88 and the associated gasket or other sealing structure. In this embodiment, expansion port 90 is positioned within back portion 86 of housing 12 and behind seal 88. Expansion port 90 includes a door 92, a chamber that extends into computer 10, and connection hardware for electrically engaging the expansion device received by the expansion port 90. The expansion port 90 is exposed when door 92 is opened (as shown by the phantom lines), thereby allowing an expansion device to be inserted into expansion port 90.

As in conventional devices, expansion port 90 is positioned at the top end of the computer 10, where the expansion port can be easily accessed by the user to insert and extract expansion devices without interfering with the normal interaction between the user and the display device and keypad assembly. The precise orientation of expansion port 90 can vary depending on the other components included in any particular electronics device. However, in one embodiment, expansion port 90 can be aligned such that expansion devices received by the expansion port are inserted and withdrawn along a line that is generally parallel to the plane of computer 10 defined by keypad structure 16.

Positioning seal 88 and expansion port 90 in the manner depicted in FIGS. 2 and 3 allows computer 10 to be a rugged, substantially watertight computer that can be used in a variety of environmental conditions without being damaged. Moreover, seal 88 and the associated gasket can be relatively simple compared to that which would be necessary if expansion port 90 were to be aligned with, straddle, or interfere with the gasket.

While the location of the expansion port is shown generally at reference number 90, a specific example of hardware associated with an expansion port of the invention is illustrated in FIG. 2, which depicts a user-accessible PC card slot 102 and a card 104 having been inserted therein. Card 104 can be mass data storage, an input/output device, or any other expansion device that enhances the capabilities of computer 10, thereby enabling computer 10 to take advantage of any of a variety existing or future technologies. For instance, computer 10 can be fitted with a global positioning system receiver, a laser bar code scanner, telecommunication devices, or any other such devices.

It should be appreciated that as computer 10 is fitted with various hardware components that the shape and size of door 92 can be modified accordingly to accommodate the storage and configuration requirements of the various hardware components. By modifying the design of door 92, expansion port 90 is likewise modified, enabling various expansion devices to be inserted into expansion port 90 without affecting the watertight nature of seal 88. It should also be appreciated that door 92 can be configured so as to be selectively removable and replaceable with alternative embodiments of door 92 in order to accommodate the various storage space requirements of current and future expansion device technologies.

The foregoing expansion ports can be used with portable electronics devices that have any type of keypad, housing, or display devices and, indeed, can be used with portable electronics devices that have no keypad or display device. Thus, the invention can be practiced with or without the other novel structures disclosed hereinafter, including the removable bezel, the selectively disabled touch sensitive screen, and the ergonomic features of the housing. However, including some or all of these other novel structures in addition to the expansion ports of the invention can result in a portable electronics device that can be both held comfortably and conveniently used in adverse environmental conditions. Thus, the description will now proceed to these additional novel features.

2. Touch Sensitive Screen

Figure 4:
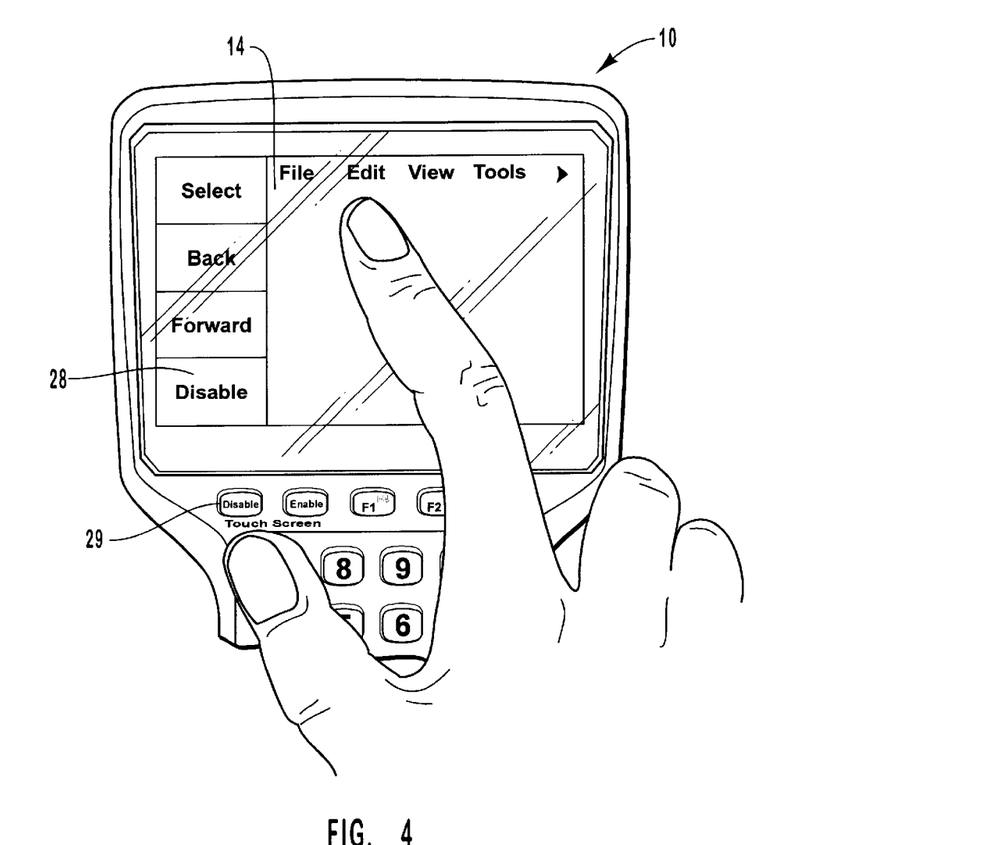
FIG. 4 illustrates a touch sensitive screen associated with the handheld computer, wherein the touch sensitive screen can be selectively disabled to facilitate cleaning of the screen.

FIG. 4 illustrates a touch sensitive screen, the touch sensitivity of which can be selectively disabled to permit the user to clean the touch sensitive screen without causing input to be inadvertently entered to computer 10. Touch sensitive screen 14 can be any desired touch sensitive screen, including those that are currently used in consumer electronics devices. Touch sensitive screen 14 can be used in combination with or in place of a keypad structure. While touch sensitive screens are one of the most intuitive forms of input devices, conventional touch sensitive screens can be cleaned only when the entire electronics device or the entire display device is disabled or powered down.

Rather than requiring the entire computer 10 or the entire display device to be disabled or powered down, only the touch sensitivity of screen 14 is disabled. Thus, when computer 10 is exposed to dust, dirt, water, or other adverse environmental conditions, and the user whishes to wipe or clean off screen 14, the user can merely disable the touch sensitivity of the screen prior to cleaning. Once the touch sensitivity is disabled, the user can clean the screen 14 using a hand or any object as desired without the risk of applying pressure to screen 14 that would cause input to be inadvertently entered to computer 10. Moreover, because the entire computer 10 or the entire display device is not disabled, the user can continue to view information on screen 14 while the touch sensitivity of the screen is disabled. In this manner, users can find that the screen can be cleaned more quickly and more conveniently than has been possible in conventional devices. After the user has cleaned screen 14 as desired, the touch sensitivity of the screen can be re-enabled so that the screen can again be used as an input device.

Disabling the touch sensitivity of screen 14 can be performed in one of a variety of ways. For instance, touch sensitive screen 14 can include a pressure sensitive region and an associated portion of a displayed image 28 that, when touched, responds by disabling the touch sensitivity. Alternatively, a key 29 located in a keypad structure or any other position on computer 10 can be used to disable the touch sensitivity of screen 14. Those skilled in the art will recognize that there are a variety of structures that can be used to receive input from the user requesting that the touch sensitivity be enabled or disabled.

Computer 10 can include hardware circuitry, software logic, or a combination thereof that responds to input requesting enablement and disablement of the touch sensitivity. For example, a hardware mechanism for disabling the touch sensitivity can cause electrical signals generated by touch sensitive screen 14 to not be generated, can cause the screen to not react to pressure, or can interfere with such electrical signals such that computer 10 fails to respond thereto. Software mechanisms can interfere with the ability of software associated with touch sensitive screen 14 to operate in response to pressure or can cause other software operating on computer 10 (i.e., operating systems, applications) to fail to respond to signals generated by the screen. Thus, "disabling" touch sensitivity, as used herein, refers to acts associated with causing touch sensitive screen 14 to fail to respond to applied pressure and also refers to acts associated with causing computer 10 to not respond to input signals generated by touch sensitive screen 14. Those skilled in the art will recognize, upon learning of the disclosure made herein, that other mechanisms and structures for disabling touch sensitivity can be used.

3. Ergonomic Features of Housing

Figure 5:
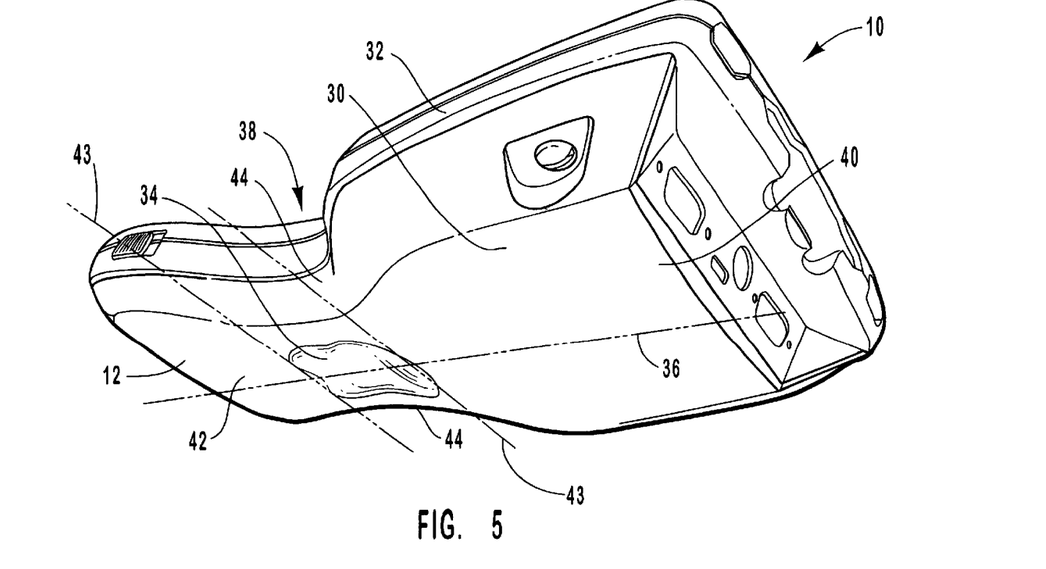
FIG. 5 is a back perspective view of the handheld computer of FIG. 1.

FIG. 5 is a back perspective view of computer 10 of FIG. 1, showing several of the ergonomic features that can allow the computer to be held comfortably by a user. FIG. 5 illustrates a back surface 30 of housing 12 and lateral surface 32. Another later surface is positioned on an opposite side of housing 12 from lateral surface 32 shown in FIG. 5. As one part of the ergonomic features, back surface 30 has formed therein a shallow depression 34 for engaging the fingers portions of the palm of a hand of a user who holds computer 10. Depression 34 can take any of a variety of shapes, so long as the user's fingers or a portion of the palm can be received therein or can grip housing 12 in the depression. In the embodiment illustrated in FIG. 5, depression 34 has an oblong shape with the major axis aligned with the longitudinal axis of computer 10 and situated at the midline 36 of housing 12. A depression 34 having this position and shape enables the computer 10 to be held equally well with either hand and permits several fingers to potentially grip housing 12 within depression 34. In another embodiment, depression 34 takes the form of elongate channel formed on back surface 12 along midline 36, which also enables the fingers or the palm of the hand to grip the housing.

FIG. 5 also illustrates how housing 12 and the body of computer 10 can be described conceptually in terms of three regions or sections, which together form a unitary or integrated device. In particular, housing 12 can be described as having a middle gripping region 38 positioned between a top section 40 and a bottom section 42. As shown in FIG. 5, the conceptual boundaries between these portions 38, 40, and 42 can be generally defined by dotted lines 43, which are presented for illustration purposes. Middle gripping region 38 can be narrower than the adjacent top section 40 and bottom section 42, so that the user's hand does not tend to slip upwards or downwards away from gripping region 38.

Yet another ergonomic feature of this embodiment relates to rounded corners 44 at the portion of housing 12 where lateral surfaces 32 meet back surface 30. Rounded corners 44, in contrast to relatively sharp corners of housings found in other portable electronics devices, allow computer 10 to be comfortably held in a user's hand or hands for extended periods of time without causing discomfort.

Other ergonomic features, in addition to those described above in reference to FIG. 5, are illustrated in FIG. 1. For instance housing 12 can have rounded corners 60 where front surface 20 and lateral surface 32 meet. These rounded corners further enhance the comfort of the user when computer 10 is held for extended periods of time.

Another ergonomic feature of computer 10 according to one embodiment is the angular position of screen 14 with respect to the position of the remainder of front surface 20, as illustrated in FIG. 3, which is a side view of computer 10. In this embodiment, the screen, the position of which is indicated by reference number 14, defines a plane 70 and a line 72 normal thereto that extends away from screen 14. Similarly, the keypad structure, the position of which is indicated by reference number 16, defines another plane 74 and a line 76 normal thereto that extends away from the keypad structure 16. Rather than the plane 74 defined by keypad structure 16 and the plane 70 defined by screen 14 being coplanar or parallel, these two planes are angularly displaced relative to one another. Stated another way, the two normal lines 76 and 72 are nonparallel and can intersect one with another at a position above keypad structure 16.

The result of the geometry illustrated in FIG. 3 is that screen 14 is tilted upwards from the plane 74 defined by keypad structure 16 so that it can be more easily viewed by the user while the user hold computer 10. Positioning screen 14 in this manner avoids the situation where the user is required to repeatedly rotate the wrist as the user alternates between using keypad structure 16 and viewing screen 14. Moreover, the user can simultaneously view screen 14 and use keypad structure 16, with both being in a comfortable position.

Figure 6A:
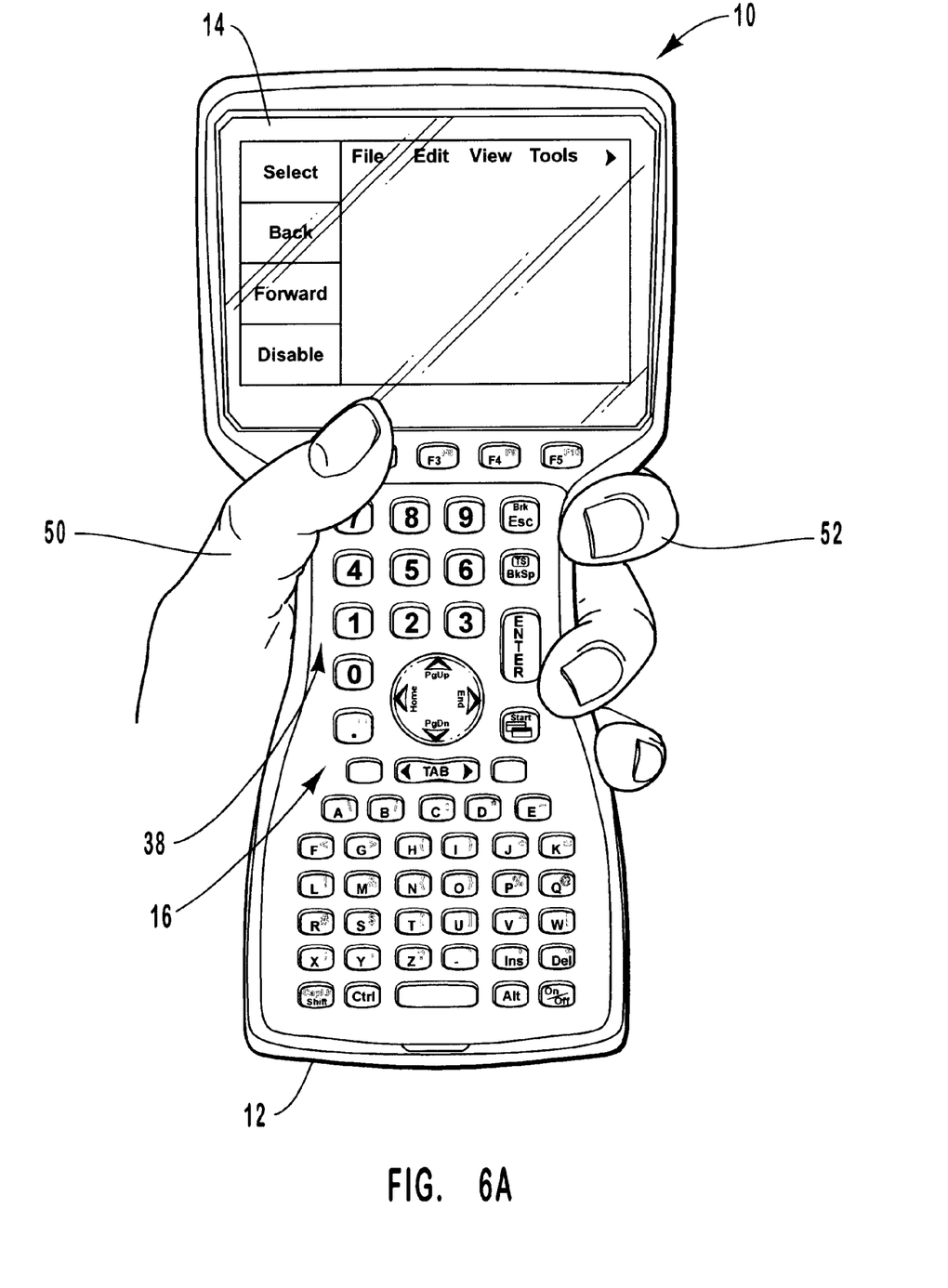
FIG. 6A shows a user holding the handheld computer of FIG. 1 using one hand in a first grip.
Figure 6B:
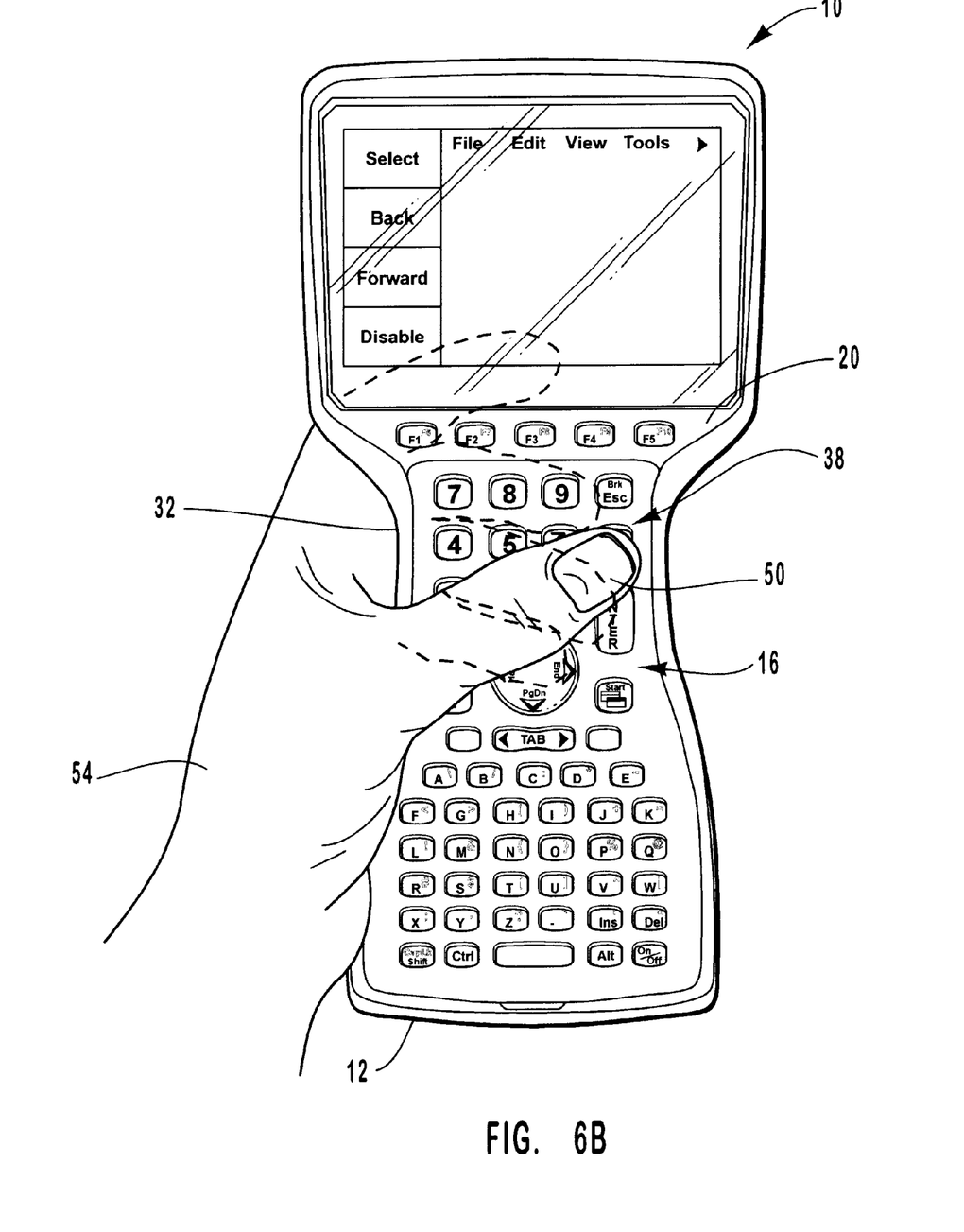
FIG. 6B illustrates a user holding the handheld computer of FIG. 1 using one hand in a second grip.
Figure 6C:
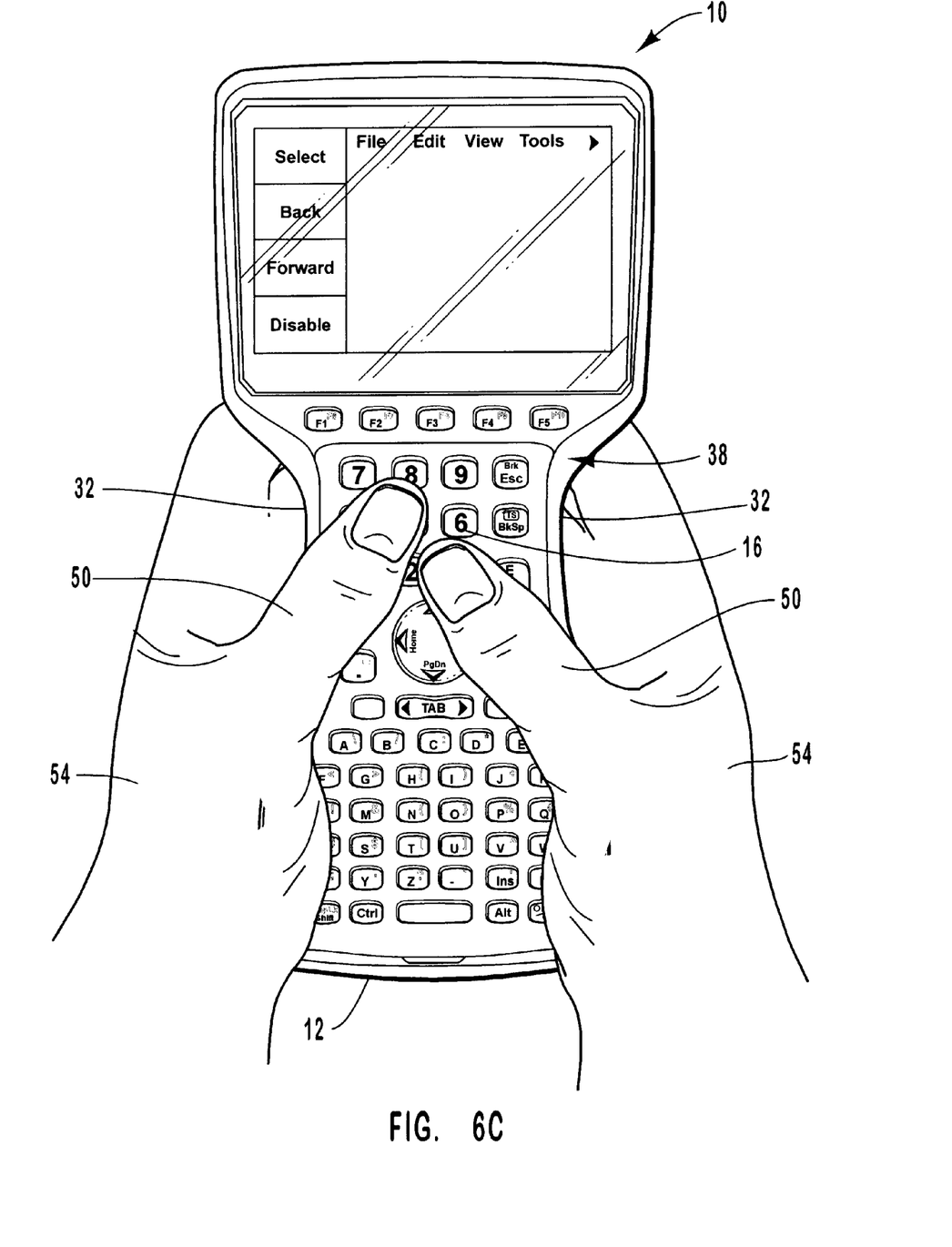
FIG. 6C illustrates a user holding the handheld computer of FIG. 1 using two hands in a third grip.

FIGS. 6A–6C illustrate computer 10 of FIG. 5 being held by a user in three different positions that take advantage of the shape of housing 12. These three positions are not exhaustive of the ways in which a user can hold computer 10, but do illustrate that the user can shift between positions and can select a position according to the particular task that is being performed with computer 10. FIGS. 6A–6C also illustrate other ergonomic features of computer 10.

Turning first to FIG. 6A, the user is grasping the gripping region 38 of housing 12 with one hand, with the upper portion of the palm being positioned on the depression of the back surface. For instance, the depression 34, shown in FIG. 5, can engage the rounded portion of the palm that is opposite the knuckles of the fingers, particularly the index and middle fingers. Positioning this portion of the palm of hand in the depression inhibits slippage of housing 12 with respect to the user's hand.

As further illustrated in FIG. 6A, fingers 52 are wrapped around one lateral surface of gripping region 38 and thumb 50 is wrapped around the other lateral surface. With the hand in this position, the user can view screen 14 and to have the other hand free to enter information into the keypad structure 16 or to engage in other activities.

FIG. 6B illustrates computer 10 being grasped by the user with one hand in another position. In this position, one or more of the fingertips or another portion of the fingers are positioned in the depression on the back surface of housing 12. Positioning the fingertips or another portion of the fingers within the depression in this manner allows the user to firmly grasp computer 10. The center portion of the palm is positioned at lateral surface 32 of gripping portion 38 as illustrated in FIG. 6B, with the thumb of the hand and the nearby portions of the palm being positioned at or near the front surface 20. This position enables the user to have one free hand and to enter data to keypad structure 16 using the free hand or thumb 50 of hand 54.

FIG. 6C illustrates a user grasping computer 10 using two hands. In this position, the fingertips or another portion of one of more fingers of both hands 54 engage the depression on the back surface of housing 12. Portions of the palms of the hands rest on the lateral surfaces 32 of gripping section 38. Both thumbs 50 are positioned on or over keypad structure 16 and are available to depress keys 18 to enter information into computer 10. Using both thumbs 50 enables faster keying of data than is possible using only one thumb 50. This position also allows the user to grasp computer 10 in a highly secure manner while simultaneously enter information into the computer.

4. Removable Bezel

Figures 7, 8:
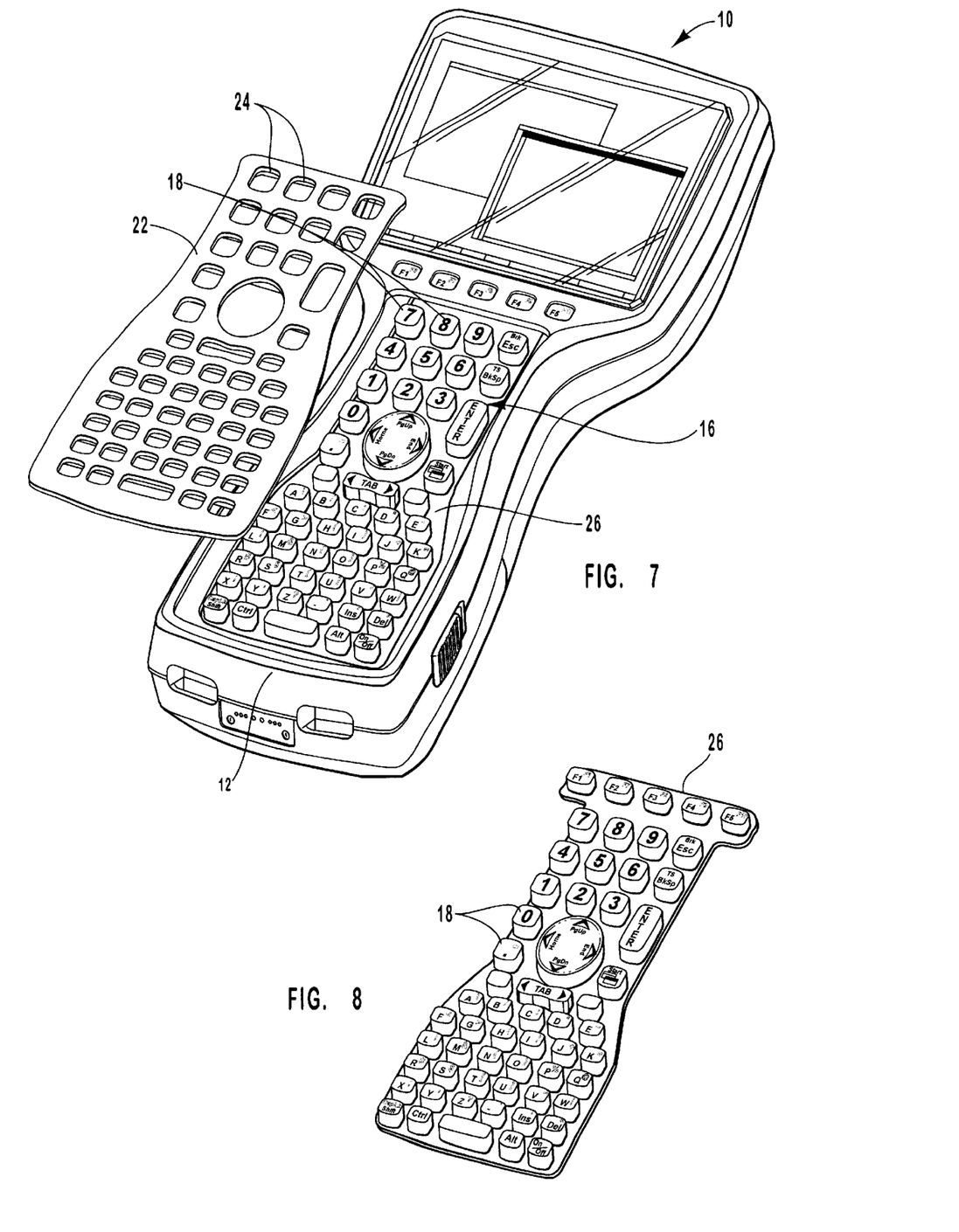
FIG. 7 illustrates the bezel of the handheld computer of FIG. 1 having been removed from the keypad structure to facilitate cleaning of various portions of the computer.
FIG. 8 illustrates a portion of a pliable protective structure that conforms to the keypad structure of the handheld computer.

A removable bezel that facilitates the cleaning of the keypad structure of computer 10 of FIG. 1 is illustrated in greater detail in FIG. 7. Bezel 22 is illustrated in FIG. 7 as having been removed from housing 12. When positioned on housing 12, bezel 22 is snap-fitted or otherwise removably attached to front surface 20 of housing 12 generally over keypad structure 16. Bezel 22 has an array of holes 24 that are in registry with the corresponding keys 18 of keypad structure 16, such that when the bezel is positioned on housing 12, the keys 18 extend through the corresponding holes 24. With bezel 22 positioned on housing 12, keys 18 are accessible and keypad structure 16 can be used in a normal manner to input data to computer 10. In the embodiment illustrated in FIG. 7, bezel 22 is a substantially rigid structure formed of a polymeric material or another material that is readily cleaned.

A removable bezel assembly illustrated in FIG. 7 is particularly useful where computer 10 is used in environments where exposure to water, dust, dirt, or other adverse conditions can be expected. Bezel 22 is removable to allow both the front and back surfaces of the bezel to be cleaned when it is exposed to dust, dirt, or other adverse environmental conditions. Moreover, removing bezel 22 from computer 10 allows the keypad structure 16 to be conveniently cleaned.

In this embodiment, keypad structure 16 includes a pliable protective structure 26, shown in both FIGS. 7 and 8, formed from a polymeric material that conforms to keys 18 and to housing 12 in a manner that seals the interior of housing 12 and also presents a surface with relatively few intricacies for cleaning. The periphery of pliable protective structure 26 is sealingly fitted against the inside surface of housing 12 to prevent water or other material from entering the interior of the housing. Moreover, the pliable protective structure 26 provides protection for keys 18 and a substantially non-slip surface for contact with the user's fingers when the user depresses the keys to the keypad structure.

When portable computer 10 is exposed to dirt, dust, or other adverse environmental conditions, the removable bezel 22 is removed to expose pliable protective structure 26. In this manner, keypad structure 16 can be easily wiped clean of any dirt or dust and can remove any foreign material that would otherwise be trapped within the keypad structure of the computer. Moreover, pliable protective structure 26 seals the interior of housing 12 such that water or other cleaning agents do not enter the interior of housing 12 and potentially damage the processing components of computer 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A portable electronics device that is capable of receiving an expansion device, comprising:
   a housing including a front portion and a back portion;
   a seal at the interface between the front portion and the back portion of the housing; and
   an expansion port for receiving an expansion device, the expansion port being positioned at one end of the electronics device and being formed in the back portion of the housing such that the expansion port does not straddle or interfere with the seal, the expansion port comprising:
      a first door that is selectively removable and pivotally attached to the back portion of the housing; and
      a chamber extending into the electronics device, the chamber being accessible when the door is open.

2. A portable electronics device as recited in claim 1, wherein said first door is replaceable with at least one second door, said second door having a different design than a design of the first door.

3. A portable electronics device as recited in claim 1, wherein the seal comprises a gasket sealingly engaged with both the front portion and the back portion of the housing.

4. A portable electronics device as recited in claim 1, wherein the seal extends about a periphery of the housing, the seal being displaced toward a front surface of the housing at a top end of the electronics device so as to provide sufficient space for the expansion port to be positioned in the back portion of the housing at the top end of the electronics device.

5. A portable electronics device as recited in claim 1, wherein the seal is substantially watertight, the portable electronics device further comprising:
   a keypad structure having keys; and
   a pliable protective structure covering the keypad structure such that the keys can be depressed through the pliable protective structure and such that the keypad structure is substantially watertight.

6. A portable electronics device as recited in claim 1, further comprising a display device positioned in the front portion of the housing at the top end of the electronics device.

7. A portable electronics device that is capable of receiving an expansion device, comprising:
   a housing including a front portion and a back portion;
   a seal having an associated gasket at the interface between the front portion and the back portion of the housing, the gasket extending around a periphery of the housing, wherein:
      the gasket, near a bottom end of the electronics device, lies in a sealing plane aligned substantially parallel to a plane defined by a keypad structure of the electronics device; and
      the gasket, near the top end of the electronics device, is displaced from said sealing plane toward a front surface of the housing; and
   an expansion port for receiving an expansion device, wherein the displacement of the gasket near the top end provides sufficient space for the expansion port to be positioned at a top end of the electronics device and to be formed in the back portion of the housing such that the expansion port does not straddle or interfere with the gasket, the expansion port including:
      a door formed in the back portion of the housing; and
      a chamber extending into the electronics device, the chamber being accessible when the door is open.

8. A portable electronics device as recited in claim 7, wherein the expansion port is positioned such that the expansion port receives expansion devices in a direction substantially parallel to the plane defined by the keypad structure.

9. A portable electronics device as recited in claim 7, wherein the seal is substantially watertight.

10. A portable electronics device as recited in claim 7, further comprising a display device positioned in the front portion of the housing at the top end of the electronics device.

11. A portable electronics device as recited in claim 7, further comprising:
   a keypad section having keys; and
   a pliable protective structure covering the keypad section such that the keys can be depressed through the pliable protective structure and such that the keypad structure is substantially watertight.

12. A portable electronics device as recited in claim 7, wherein the door is selectively removable.

13. A portable electronics device as recited in claim 7, wherein the expansion port is aligned such that the expansion port is capable of receiving the expansion device as the expansion device is inserted into the expansion port along a line that is generally parallel to the plane defined by the keypad structure.

14. A portable computer that is capable of receiving an expansion device without compromising the integrity of a seal associated with the housing of the computer, comprising:
   a housing including a front portion and a back portion;
   a seal having an associated gasket at the interface between the front portion and the back portion, the seal being substantially watertight;
   an expansion port for receiving an expansion device, the expansion port being positioned at a top end of the electronics device and being formed in the back portion of the housing such that the expansion port does not straddle or interfere with the gasket, the expansion port including;
      a door formed in the back portion of the housing;
      a chamber extending into the electronics device, the chamber being accessible when the door is open; and
      connection hardware for electrically engaging an expansion device when the expansion device is received by the expansion port;
   a keypad section having keys; and
   a pliable protective structure covering the keypad section such that the keys can be depressed through the pliable protective structure and such that the keypad structure is substantially watertight.

15. A portable computer as recited in claim 14, wherein the seal extends about a periphery of the housing, the seal being displaced toward a front surface of the housing at the top end of the electronics device so as to provide sufficient space for the expansion port to be positioned in the back portion of the housing at the top end of the electronics device.

16. A portable electronics device that is capable of receiving an expansion device, comprising:

a housing including a front portion and a back portion;

a substantially watertight seal at the interface between the front portion and the back portion of the housing;

a keypad structure having keys;

a pliable protective structure covering the keypad structure such that the keys can be depressed through the pliable protective structure and such that the keypad structure is substantially watertight; and an expansion port for receiving an expansion device, the expansion port being positioned at one end of the electronics device and being formed in the back portion of the housing such that the expansion port does not straddle or interfere with the seal.

17. A portable electronics device as recited in claim 16, wherein the expansion port comprises:

a door formed in the back portion of the housing; and a chamber extending into the electronics device, the chamber being accessible when the door is open.

18. A portable electronics device as recited in claim 17, wherein the seal comprises a gasket sealingly engaged with both the front portion and the back portion of the housing.

19. A portable electronics device as recited in claim 16, further comprising a display device positioned in the front portion of the housing at the top end of the electronics device.

20. A portable electronics device as recited in claim 16, wherein the seal extends about a periphery of the housing, the seal being displaced toward a front surface of the housing at said one end of the electronics device so as to provide sufficient space for the expansion port to be positioned in the back portion of the housing at said one end of the electronics device.

* * * * *